March 28, 1939.  J. D. CUNNINGHAM  2,152,303
RECORDING INSTRUMENT
Original Filed Jan. 6, 1936
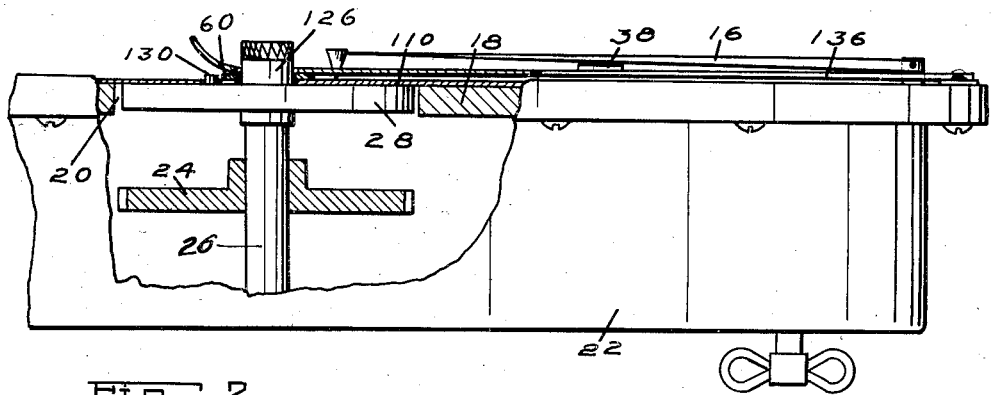
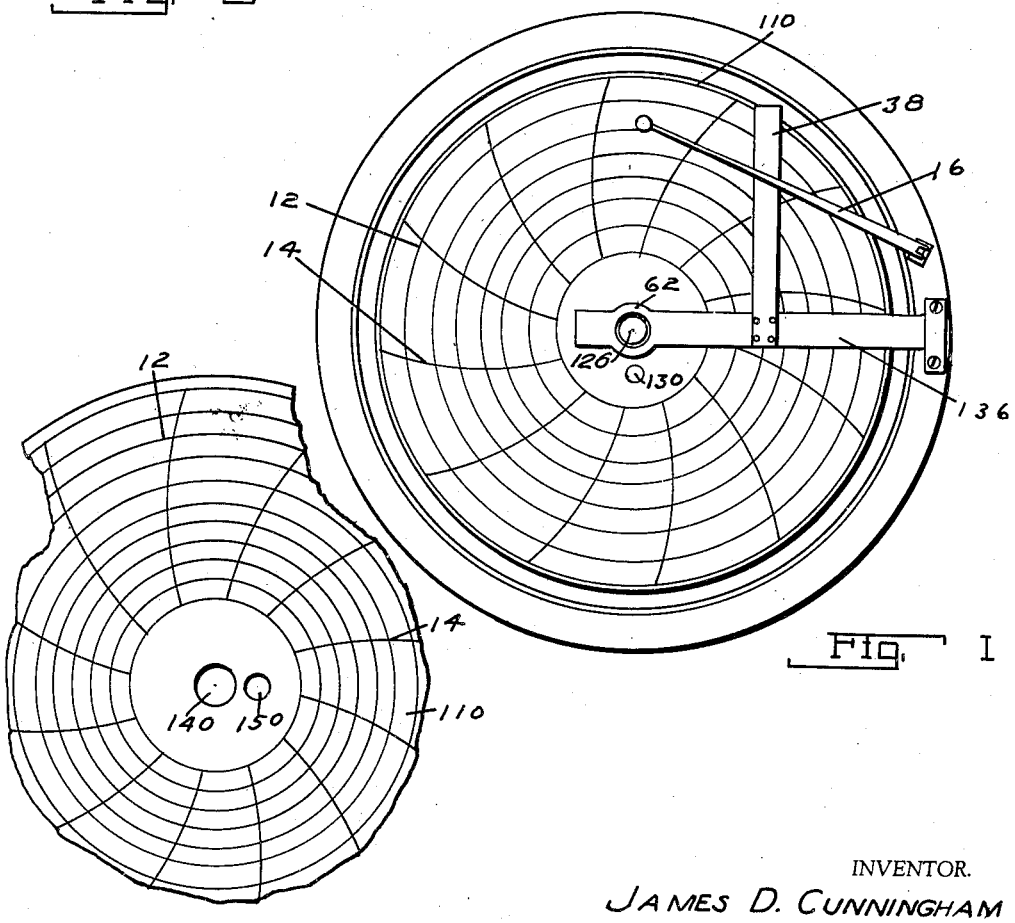
INVENTOR.
JAMES D. CUNNINGHAM
BY McConkey & Booth
ATTORNEYS.

Patented Mar. 28, 1939

2,152,303

UNITED STATES PATENT OFFICE 2,152,303

RECORDING INSTRUMENT

James D. Cunningham, Chicago, Ill., assignor to Republic Flow Meters Company, Chicago, Ill., a corporation of Illinois Original application January 6, 1936, Serial No. 57,657. Divided and this application May 4, 1936, Serial No. 77,684

1 Claim. (Cl. 234—75)

This invention relates to recording instruments, and is illustrated as embodied in such an instrument having a pen which automatically draws a record on a rotating chart.

An object of the invention is to simplify the insertion and removal of the charts from the instrument, and to insure that without special attention being paid to its adjustment a new chart when inserted will always be in the same time position as the one just removed.

I utilize, in the embodiment illustrated, a chart having a central opening which seats over a driving post forming part of the instrument, and an offset timing opening seating over a timing pin or the like and which is arranged in a definite position relative to the indicia printed on the chart.

An important feature of the invention relates to holding the chart in position by a yielding member formed with an opening for the driving post and providing an annular clamping portion engaging and holding the chart about the post. Preferably this member is arranged to serve the additional function of a pen lifter.

The above and other objects and features of the invention, including various novel combinations of parts and desirable particular arrangements, will be apparent from the following description of the illustrative embodiment shown in the accompanying drawing, in which:

Figure 1 is a plan view of a recording instrument embodying the invention;

Figure 2 is a partial section therethrough; and

Figure 3 is a partial plan view of the chart used therewith.

The illustrated chart 110 is formed with printed indicia, such as a series of concentric circles 12 arranged on a suitable scale to indicate temperature, pressure, or other condition whose value is to be recorded on the chart, and a series of arcuate time lines 14 on the arcs of circles whose centers are outside the periphery of the chart and which pass through the center of the chart. The time lines 14 at different hours of the day successively coincide with the path of movement of a recording pen 16 pivoted adjacent the periphery of the chart and actuated by any of the well-known condition-measuring devices (not herein shown).

The chart is intended for use with an instrument shown as including a clock mechanism inclosed in a suitable housing 22 formed with an opening 20 in its upper face, and the final gear 24 of which is frictionally mounted on, and adjustable relative to, a driving post 26 having a flange 28 in the opening 20 and supporting the central portion of the chart 110 when mounted in the instrument. The part 126 of the driving post 26 which is above the flange 28 fits into an opening 140 in the center of the chart. The chart also has an opening 150, arranged in a predetermined definite relation with respect to the indicia 12 and 14 printed on the chart, and which fits over a timing pin 130 carried by the flange 28.

The chart is held clamped in place by a washer or the like 60 which encircles the part 126 of the driving post, and which is secured to the lower face of an annular end portion 62 of an arm 136, shown as a leaf spring secured at its outer end to the instrument casing. The inner end of the arm 136 is turned up, to be grasped conveniently by an operator when changing charts, and to clear the timing pin 130. The thickness of the washer 60 is such that the pin 130 is also cleared by the body of arm 136 on the other side of the driving post 126.

The arm 136 preferably carries a lateral projection 38 extending beneath the pen 16, so that lifting the arm 136 to release the chart also serves to lift the pen 16 off the chart.

While one illustrative arrangement has been described in detail, it is not my intention to limit the scope of my invention to that particular arrangement, or otherwise than by the terms of the appended claim. The present application is a division of my application No. 57,657, filed January 6, 1936, now Patent No. 2,073,143.

I claim:

An instrument comprising a driving post provided with a flange for supporting a chart having an opening to be centered on said post and yielding holding means for the chart including a leaf spring arm secured at one end to the instrument beyond the margin of the chart and biased toward the chart, said holding means being formed with an annular portion loosely encircling the driving post and directly engaging the chart to press it against the supporting flange.

JAMES D. CUNNINGHAM.